(Model.)

R. P. SCOTT.
APPLE PARER.

No. 283,031. Patented Aug. 14, 1883.

Witnesses:
T. C. Brecht
F. L. Browne

Inventor:
R. P. Scott

UNITED STATES PATENT OFFICE.

ROBERT P. SCOTT, OF BALTIMORE, MARYLAND, ASSIGNOR TO THE SCOTT MANUFACTURING COMPANY, OF SAME PLACE.

APPLE-PARER.

SPECIFICATION forming part of Letters Patent No. 283,031, dated August 14, 1883.

Application filed March 29, 1883. (Model.)

*To all whom it may concern:*

Be it known that I, ROBERT P. SCOTT, a citizen of the United States, residing at Baltimore, State of Maryland, have invented certain new and useful Improvements in Apple Paring, Coring, and Slicing Machines; and I do hereby declare the following to be a full, clear, and exact description of the invention, such as will enable others skilled in the art to which it appertains to make and use the same.

My invention relates to that class of machines used for paring, coring, and slicing apples. The object is to do similar work to that done by some other machines, but by simpler and less expensive mechanism, and possibly obtain better results.

The invention consists in a new mode of acquiring a forward spiral motion and such auxiliary motions as required to make a complete working mechanism for the purpose desired.

Figure 1:
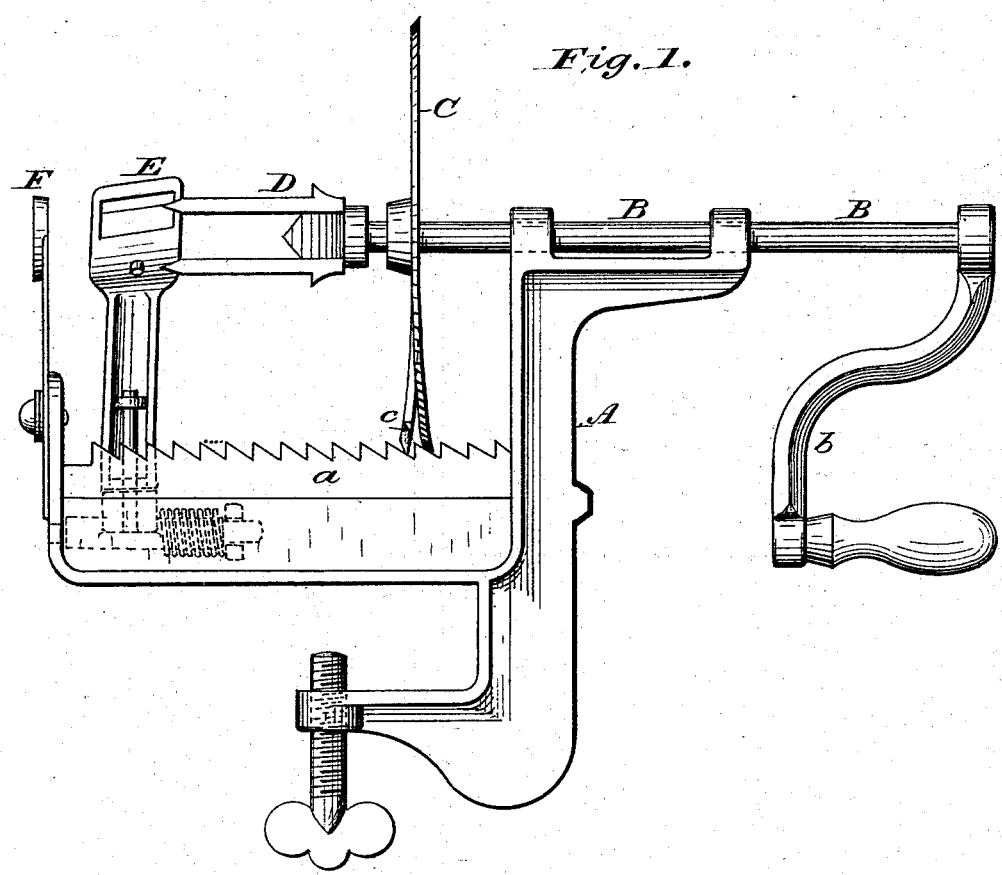
Figure 2:
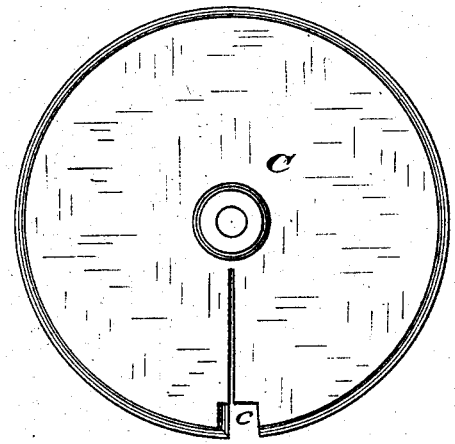

In the drawings, Figure 1 is a front elevation. Fig. 2 is a detached view of worm-disk C.

I have first a smooth, round, straight rod, B, working freely in and through bearings or lugs extending from a main frame, A. The latter is provided with the usual clamp-screw for fastening the machine to a table. The shaft B has a crank, *b*, upon one end, and a handle for turning the same and operating the shaft B in the manner hereinafter described.

It is common in apple-parers to have a screw-thread cut upon a shaft, B, and a device whereby the shaft may be allowed to be drawn straight back, when the work has been done on the apple. In my machine the motion imparted to the shaft B is somewhat similar to the screw form; but I obtain the required motion by different mechanism, as follows:

A worm-edged concentric disk, C, is made fast to the shaft B. Said disk has a diameter greater than that of an ordinary apple, and is provided with an opening, *c*, in its edge. The remaining part of the edge takes the form of a worm or spiral, so that, by revolving it, the disk will feed itself along a toothed rack, *a*—that is, each revolution carries it forward one tooth in the rack *a*. The mechanical movement, consisting of a worm and rack, is so common that it need only be said that I use such a device, and that the rack is stationary, and the shaft B free to follow the disk C in its rotary and reciprocal motion.

The difficulty of returning the part, which I will hereinafter designate the "worm-disk" C, together with the shaft B and its operating functions all back to the starting-point, is overcome in a manner which is a feature of this invention, to wit: a simple opening, *c*, in the periphery of the worm-disk C of such dimensions that it will clear the rack *a*, but not so large as to be very liable to lose a notch in its advancing course—that is to say, by the continuous turning of the crank *b* the opening *c* will be carried past the rack *a*, and the worm-disk C will not vary from its regular forward course. This is evidently more sure to be the case when the diameter of the worm-disk C is great, though I do not wish to confine myself to any particular size, nor to leave the opening *c* entirely open, as I have tried having the same fitted up with a sort of latch that could be thrown out of the way when it was desired to push or pull the shaft B reciprocally in either direction; but I have discarded that part of the invention, for the reason that it does not at present seem to be required; also, the rack *a* could be made to move or be turned over out of reach of the worm-disk C. One reason for having the diameter of worm-disk C large is that the apple will clear the rack *a*.

The machine is provided with a fork, D, attached to the end of the shaft B, opposite to the crank *b*. A paring-knife, E, is hinged to the frame A, and a coring, slicing, or combined coring and slicing, device, F, screwed fast to the frame A. These latter parts are not subjects of the present application, and some forms of each have been used prior to this invention.

The operation of the machine is as follows: The opening *c* of the worm-disk C stands over the rack *a*, and the shaft B is drawn back until the worm-disk C rests against the frame A. An apple is impaled on the fork D, and the operator pushes the shaft B forward, pressing the apple against the paring-knife E. Then commence turning the crank *b*, and, by the action of the paring-knife E and the coring and slicing knife F, the apple is pared, cored, and sliced as it advances toward the left upon the knives. Continue the turning until the crank b strikes a stop on the frame A; or, if desired, a space could be filled up in the rack a.

It is intended that the worm-disk C should stop with the opening c over the rack a, when the shaft B and its attachments are drawn freely back to the starting-point.

Having described my invention, what I claim is—

1. In an apple-parer, the combination of a frame, A, fork-shaft B, provided with a worm-disk, C, engaging in a rack, a, formed on said frame, the said disk being provided with an opening, c, whereby the fork-shaft and disk may be freely reciprocated over the rack.

2. The worm-disk C, having an opening, c, to allow a free reciprocal movement over the rack a, substantially as described.

In testimony whereof I affix my signature in presence of two witnesses.

ROBT. P. SCOTT.

Witnesses:
JOHN WILLIAMS,
THOS. H. MARSTON.